US 10,509,754 B2

(12) United States Patent
Haraguchi

(10) Patent No.: US 10,509,754 B2
(45) Date of Patent: Dec. 17, 2019

(54) INFORMATION PROCESSING APPARATUS, CONTROL METHOD FOR INFORMATION PROCESSING APPARATUS, AND STORAGE MEDIUM

(71) Applicant: CANON KABUSHIKI KAISHA, Tokyo (JP)

(72) Inventor: Takahiro Haraguchi, Matsudo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 395 days.

(21) Appl. No.: 15/292,979

(22) Filed: Oct. 13, 2016

(65) Prior Publication Data

US 2017/0109307 A1  Apr. 20, 2017

(30) Foreign Application Priority Data

Oct. 14, 2015 (JP) .................................. 2015-202719
Feb. 15, 2016 (JP) .................................. 2016-026009

(51) Int. Cl.
*G06F 13/40* (2006.01)
*G06F 13/42* (2006.01)

(52) U.S. Cl.
CPC ...... *G06F 13/4022* (2013.01); *G06F 13/4247* (2013.01)

(58) Field of Classification Search
CPC .......................... G06F 13/4022; G06F 13/4247
See application file for complete search history.

(56) References Cited

U.S. PATENT DOCUMENTS 6,018,782 A * 1/2000 Hartmann ........... G06F 15/7842
709/251

FOREIGN PATENT DOCUMENTS

| JP | H11-120155 A | 4/1999 |
| JP | 2007-025880 A | 2/2007 |
| JP | 2011-8541 A | 1/2011 |
| JP | 2012-008976 A | 1/2012 |

* cited by examiner

*Primary Examiner* — Zachary K Huson
(74) *Attorney, Agent, or Firm* — Canon U.S.A., Inc. IP Division

(57) ABSTRACT

An information processing apparatus includes a plurality of processing modules that are connected to each other on a ring bus, a connector for optionally attaching to an extension processing unit, a detection unit configured to detect attachment of the extension processing unit to the connector, and a bus switching unit configured to change, in a case where the detection unit detects the attachment of the extension processing unit, a path of the ring bus in such a manner that an extension processing module in the extension processing unit is connected.

26 Claims, 11 Drawing Sheets

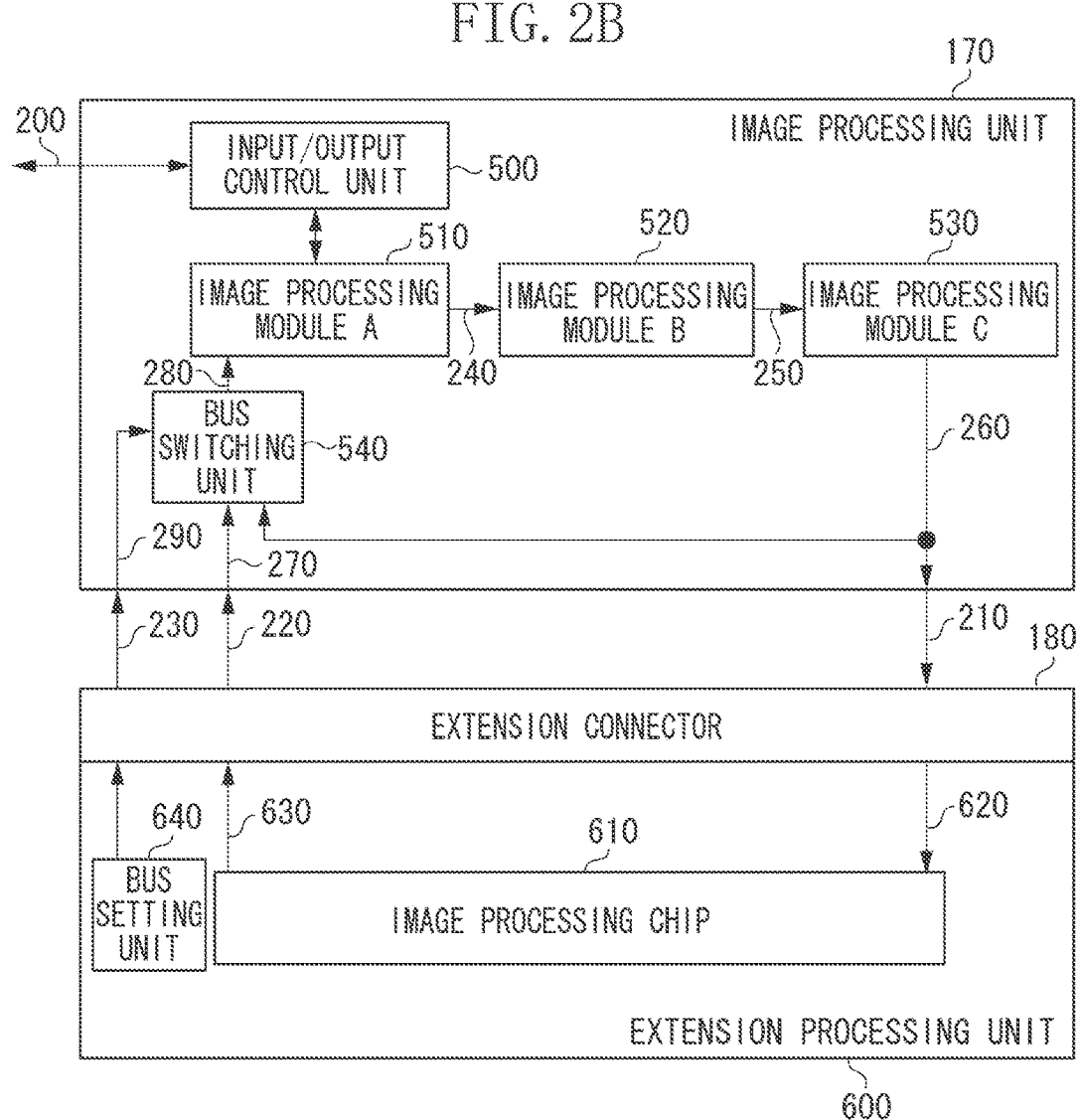

INFORMATION PROCESSING APPARATUS, CONTROL METHOD FOR INFORMATION PROCESSING APPARATUS, AND STORAGE MEDIUM

BACKGROUND OF THE INVENTION

Field of the Invention

One disclosed aspect of the embodiments relates to an information processing apparatus in which a bus structure can be changed, and to a control method for the information processing apparatus.

Description of the Related Art

A ring bus is known as a bus structure, of transmitting data in a single direction, in which a plurality of modules is connected to buses forming a ring shape. In some cases, the structure of the ring bus needs to be changed.

As a conventional method of changing the ring bus structure, a method discussed in Japanese Patent Application Laid-Open No. 2011-8541 is known as the method, of changing the ring bus structure, in which a master module outputs data for changing the bus structure to a data transmission path, and the bus structure is changed in a slave module.

More specifically, Japanese Patent Application Laid-Open No. 2011-8541 discusses a structure in which a plurality of modules is connected to each other in a ring form via a plurality of paths, and processing is executed in a manner such that the path of the ring bus is switched in accordance with data input. This method discussed in Japanese Patent Application Laid-Open No. 2011-8541 is for a configuration in which the path of the ring bus is to be selected for connecting required modules in the plurality of modules provided in advance. Therefore, a new module cannot be added once the structure is established.

Thus, a ring bus structure, having a configuration in which a function of an image forming apparatus is extended with a module which is connected to a ring bus via a connector, has been desired to be capable of easily changing the ring bus in both of a case where a new module is connected via the connector and a case where a module is not connected.

SUMMARY OF THE INVENTION

According to an aspect of the embodiments, an information processing apparatus includes a plurality of processing modules that are connected to each other on a ring bus, a connector for optionally attaching to an extension processing unit, a detection unit configured to detect attachment of the extension processing unit to the connector, and a bus switching unit configured to change, in a case where the detection unit detects the attachment of the extension processing unit, a path of the ring bus in such a manner that an extension processing module in the extension processing unit is connected.

Further features of the disclosure will become apparent from the following description of exemplary embodiments with reference to the attached drawings.

BRIEF DESCRIPTION OF THE DRAWINGS

FIGS. 2A and 2B are diagrams each illustrating a configuration of an image processing unit according to the exemplary embodiment.

DESCRIPTION OF THE EMBODIMENTS

Exemplary embodiments of an information processing apparatus are described below with reference to the drawings, by taking an image forming apparatus as an example of the information processing apparatus.

<Configuration of Image Forming Apparatus>

Figure 1:
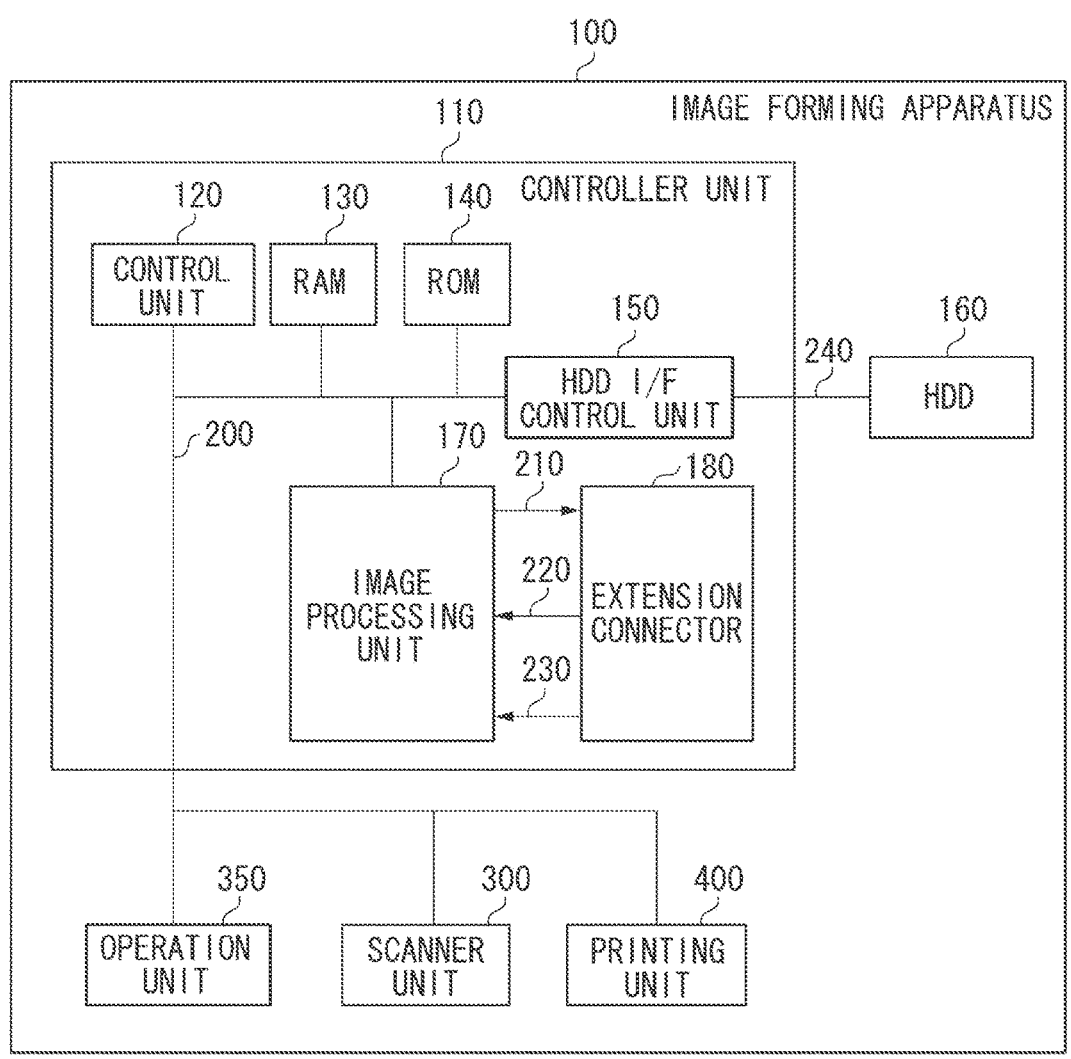
FIG. 1 is a block diagram illustrating a configuration of an image forming apparatus according to an exemplary embodiment.

FIG. 1 is a block diagram illustrating a configuration of an image forming apparatus 100 according to a first exemplary embodiment.

The image forming apparatus 100 includes a controller unit 110, a hard disk drive (HDD) 160, an operation unit 350, a scanner unit 300, and a printing unit 400.

The controller unit 110 is in charge of the entire control in the image forming apparatus 100. The controller unit 110 includes a control unit 120, a random access memory (RAM) 130, a read only memory (ROM) 140, an HDD I/F control unit 150, an image processing unit 170, and an extension connector 180.

The control unit 120 controls, based on a program in the ROM 140, the components in the controller unit 110 as well as the operation unit 350, the scanner unit 300, and the printing unit 400.

The RAM 130 functions as, for example, a work area for an operation of the control unit 120.

The ROM 140 stores therein the program which is used by the control unit 120.

The HDD I/F control unit 150 is connected to the control unit 120 via a bus 200 and is further connected to the HDD 160 via a bus 240. The control unit 120 can store data in the HDD 160 and can read the data stored in the HDD 160, via the HDD I/F control unit 150.

The HDD 160 is a nonvolatile storage device that stores therein data. A storage device (for example, a solid-state drive (SSD)) other than the HDD 160 may be employed.

The image processing unit 170 executes image processing on read image data input from the scanner unit 300 so that image data suitable for the printing unit 400 is obtained.

The extension connector 180 is a connector to which an extension processing unit 600 is attached. The extension processing unit 600 adds a function to the image forming apparatus 100.

The operation unit 350 provides various types of information to a user via a display, and receives various instructions from the user using a button and the like.

The scanner unit 300 reads a document, and inputs image data.

The printing unit 400 prints the image data obtained as a result of the image processing which is executed by the image processing unit 170 on the image data input from the scanner unit 300.

The control unit 120, the RAM 130, the ROM 140, the HDD I/F control unit 150, the image processing unit 170, the operation unit 350, the scanner unit 300, and the printing unit 400 are connected to each other via the bus 200.

The image processing unit 170 is connected to the extension connector 180 via an output ring bus 210 and an input ring bus 220, and is input a ring bus switching signal 230. The output ring bus 210 and the input ring bus 220 are buses each of which includes a data signal, a clock signal, and a strobe signal.

Figure 2A:
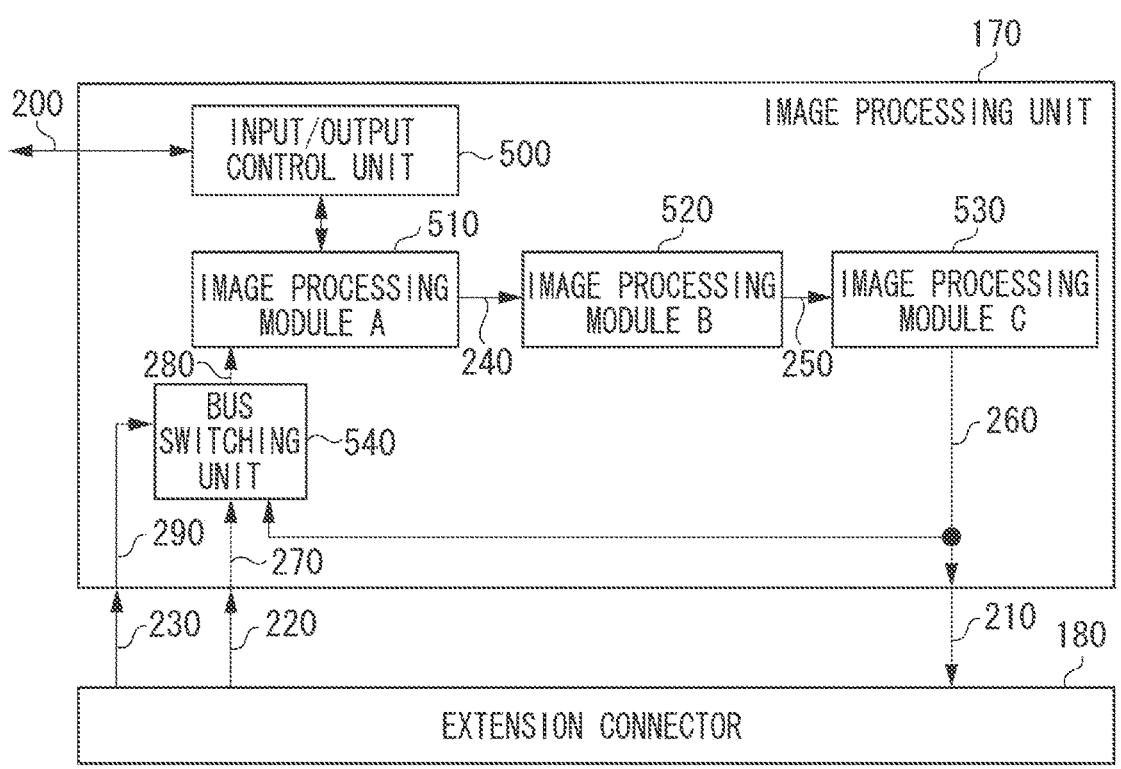

FIGS. 2A and 2B are diagrams each illustrating a configuration of the image processing unit 170. FIG. 2A is a diagram illustrating a configuration in which the extension processing unit 600 is not connected to the extension connector 180. FIG. 2B is a diagram illustrating a configuration in which the extension processing unit 600 is connected to the extension connector 180.

The image processing unit 170 includes an input/output control unit 500, an image processing module A 510, an image processing module B 520, an image processing module C 530, and a bus switching unit 540.

The input/output control unit 500 is connected to the control unit 120 via the bus 200. Upon receiving a control command issued from the control unit 120 in accordance with the program stored in the ROM 140, the input/output control unit 500 controls the image processing module A 510 in accordance with the received control command.

The image processing module A 510, the image processing module B 520, and the image processing module C 530 are modules each of which executes image processing on image data transmitted by the control unit 120 to the image processing unit 170.

The bus switching unit 540 is a switching circuit that switches a path of a ring bus. More specifically, the bus switching unit 540 switches a bus to be connected to a bus which inputs to the image processing module A 510 between a bus 260 and a bus 270 according to a bus switching signal 290. The bus switching signal 290 inputs to a terminal for the ring bus switching signal 230. The logic level of the ring bus switching signal 230 of when the extension processing unit 600 is not attached to the extension connector 180 depends on processing executed on the ring bus switching signal 230 (for example, a low level when pull down processing has been executed on the ring bus switching signal 230). When the extension processing unit 600 is attached to the extension connector 180, the ring bus switching signal 230 is to be an output value of a bus setting unit 640. The logic level of the output value of the bus setting unit 640 is opposite to that of the ring bus switching signal 230.

The ring bus in the image processing unit 170 includes the bus 240, a bus 250, the bus 260, and a bus 280. The image processing module A 510, the image processing module B 520, and the image processing module C 530 are connected to each other on the ring bus. In the ring bus, image data and setting data to be set on the image processing module A 510, the image processing module B 520, and the image processing module C 530 are transmitted in a single direction.

The bus 260 is connected to the output ring bus 210.

The bus switching unit 540 is connected to the bus 260 and also is connected to the bus 270, and is input the bus switching signal 290. Further, the bus 270 is connected to the input ring bus 220, and the bus switching signal 290 inputs to the terminal for the ring bus switching signal 230.

In such a state, the bus switching unit 540 connects the bus 260 to the bus 280 based on the logic level of the bus switching signal 290.

The ring bus extending outside the image processing unit 170 includes the bus 240, the bus 250, the bus 260, the output ring bus 210, a bus 620, a bus 630, the input ring bus 220, the bus 270, and the bus 280. In such a state illustrated in FIG. 2B, the bus 270 is connected to the bus 280 by the bus switching unit 540 based on the logic level of the bus switching signal 290.

The extension processing unit 600 includes an image processing chip 610 and the bus setting unit 640. The image forming apparatus 100 is provided with a new function when the extension processing unit 600 is attached.

The image processing chip 610 is a processing module having a new function of executing image processing on image data that is different from those executed by the image processing module A 510, the image processing module B 520, and the image processing module C 530.

The extension processing unit 600 is an option unit that can be attached based on the user's request.

The bus setting unit 640 outputs a signal, for switching the bus to be connected to the bus 280 from the bus 260 to the bus 270, to the bus switching unit 540. In a case where the processing executed on the ring bus switching signal 230 is changed to the pull down processing and the logic level of the ring bus switching signal 230 is set to low, The bus setting unit 640 is connected to a power supply via a resistor (not illustrated). The logic level of the ring bus switching signal 230 is set to high when the extension processing unit 600 is connected.

<Operation: When Extension Processing Unit 600 is not Connected>

Next, how the setting of the ring bus is switched when the extension processing unit 600 is attached to the image processing unit 170 is described.

An operation in a state as illustrated in FIG. 2A where the extension processing unit 600 is not connected is described. In this state, the ring bus is formed with the bus 240, the bus 250, the bus 260, and the bus 280 connected in series in this order by the bus switching unit 540. The image processing module A 510, the image processing module B 520, and the image processing module C 530 are connected to each other on the ring bus.

Since the pull down processing has been executed on the ring bus switching signal 230, the logic level of the ring bus switching signal 230 is at the low level. The ring bus switching signal 230 is thus input to the bus switching unit 540 as the bus switching signal 290.

Because the ring bus switching signal 230 thus input is at the low level, the bus switching unit 540 selects the bus 260 as the bus connected to the bus 280.

<Operation: Switching Operation to State where Extension Processing Unit 600 is Connected>

Next, a switching operation to a state as illustrated in FIG. 2B where the extension processing unit 600 is connected is described. The bus setting unit 640 in the extension processing unit 600 outputs the ring bus switching signal 230, for switching the bus connected to the bus 280 from the bus 260 to the bus 270, to the bus switching unit 540.

When the extension processing unit 600 is connected to the extension connector 180, the output from the bus setting unit 640 causes the logic level of the ring bus switching signal 230 to be set to high.

The bus switching unit 540 that has received the ring bus switching signal 230 switches the bus to be connected to the bus 280 from the bus 260 to the bus 270.

Thus, the bus 240, the bus 250, the bus 260, the output ring bus 210, the bus 620, the bus 630, the input ring bus 220, and the bus 270, bus 280 are connected to each other, whereby the ring bus extending outside is formed.

The image processing module A 510, the image processing module B 520, the image processing module C 530, and the image processing chip 610 of the extension processing module are connected to each other on the outer ring bus.

In the first exemplary embodiment described above, the ring bus structure can be changed in a manner such that the bus switching unit 540 switches, based on the output from the bus setting unit 640 provided in the extension processing unit 600, the bus to be connected to the bus 280 from the bus 260 to the bus 270. With the new ring bus structure thus established, the image processing chip 610 provided in the extension processing unit 600 can be added to the ring bus of the image processing unit 170 so that a new function can be provided.

In the first exemplary embodiment, the ring bus switching signal 230 is used for changing the path of the ring bus. In a second exemplary embodiment, the path of the ring bus is changed in accordance with a signal of a bus on the ring bus.

Figure 3:
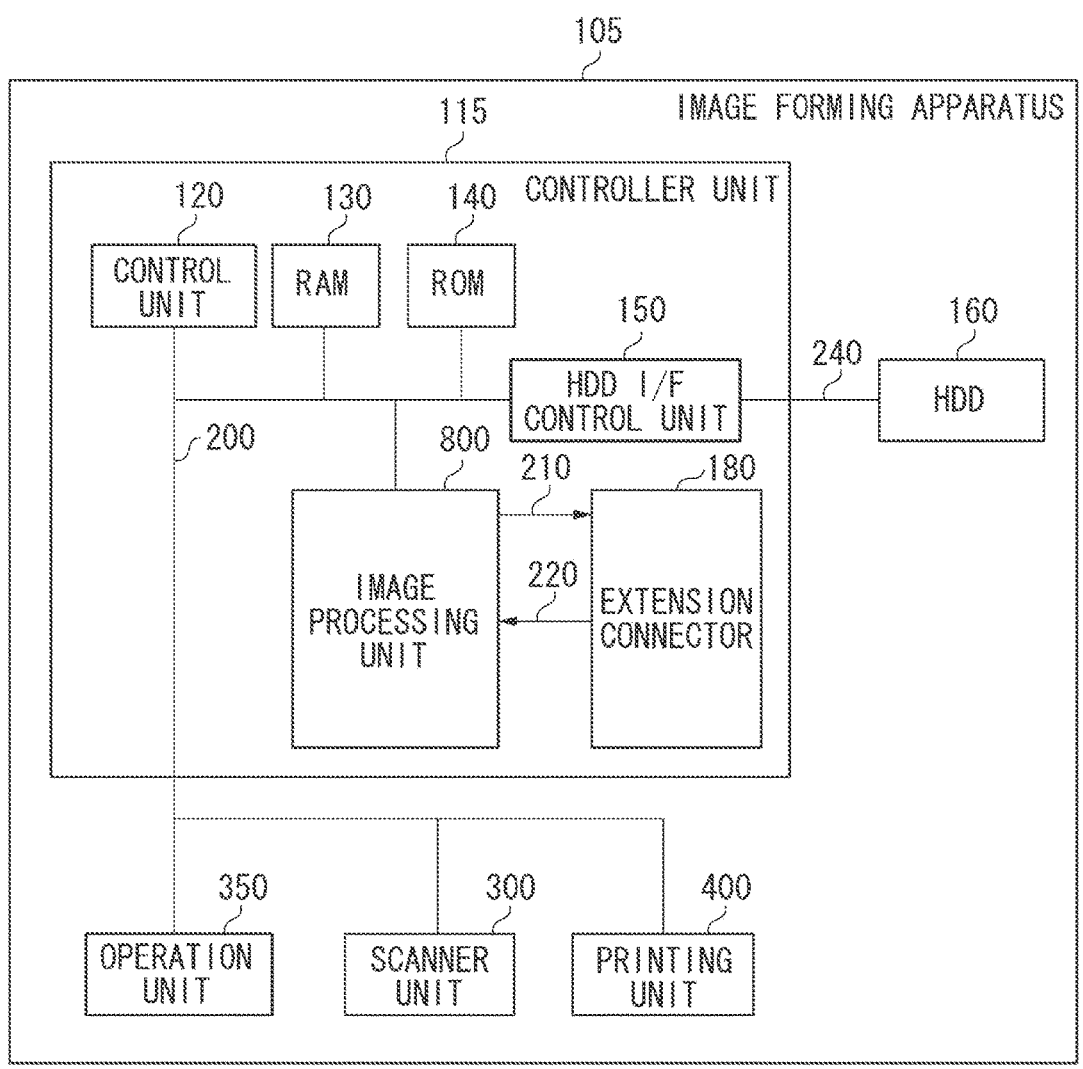
FIG. 3 is a block diagram illustrating a configuration of an image forming apparatus according to another exemplary embodiment.

FIG. 3 is a block diagram illustrating a configuration of an image forming apparatus 105 according to the second exemplary embodiment.

The configuration of the image forming apparatus 105 is the same as that of the image forming apparatus 100 except that the image forming apparatus 105 includes a controller unit 115 instead of the controller unit 110.

The configuration of the controller unit 115 is the same as that of the controller unit 110 except that the controller unit 115 is provided with an image processing unit 800. The image processing unit 800 is connected to the extension connector 180 via the output ring bus 210 and the input ring bus 220. The image processing unit 800 according to the second exemplary embodiment has no terminal for receiving the ring bus switching signal 230.

Figure 4:
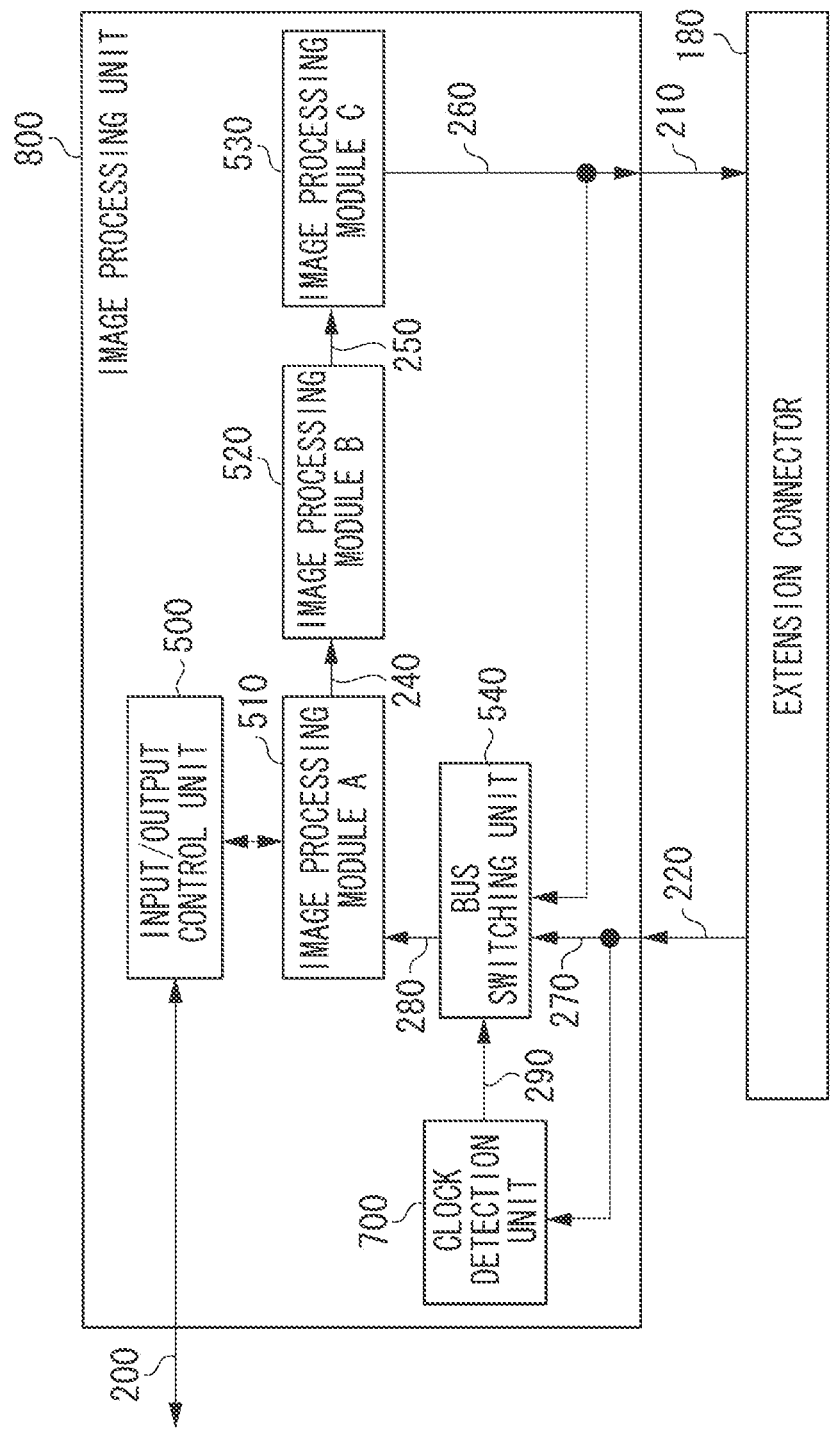
FIG. 4 is a diagram illustrating a configuration of an image processing unit according to another exemplary embodiment.

FIG. 4 is a diagram illustrating a configuration of the image processing unit 800 according to the second exemplary embodiment.

The configuration of the image processing unit 800 is the one in which a clock detection unit 700 is added to the configuration of the image processing unit 170.

The clock detection unit 700 detects a clock signal on the input ring bus 220. Upon detecting the input of the clock signal, the clock detection unit 700 generates the bus switching signal 290 for changing the bus connected to the bus 280 from the bus 260 to the bus 270, and outputs the bus switching signal 290 to the bus switching unit 540.

In the example described in the second exemplary embodiment, the bus switching signal 290 for causing the bus switching unit 540 to perform the switching is generated when the input of the clock signal on the ring bus is detected. According to the second exemplary embodiment, there can be provided an advantageous effect that even without an additional signal terminal in the image processing unit, the path of the ring bus can be changed.

In the first and the second exemplary embodiments, the bus switching unit is provided in the image processing unit.

In a third exemplary embodiment, the bus switching unit is provided outside the image processing unit.

Figure 5:
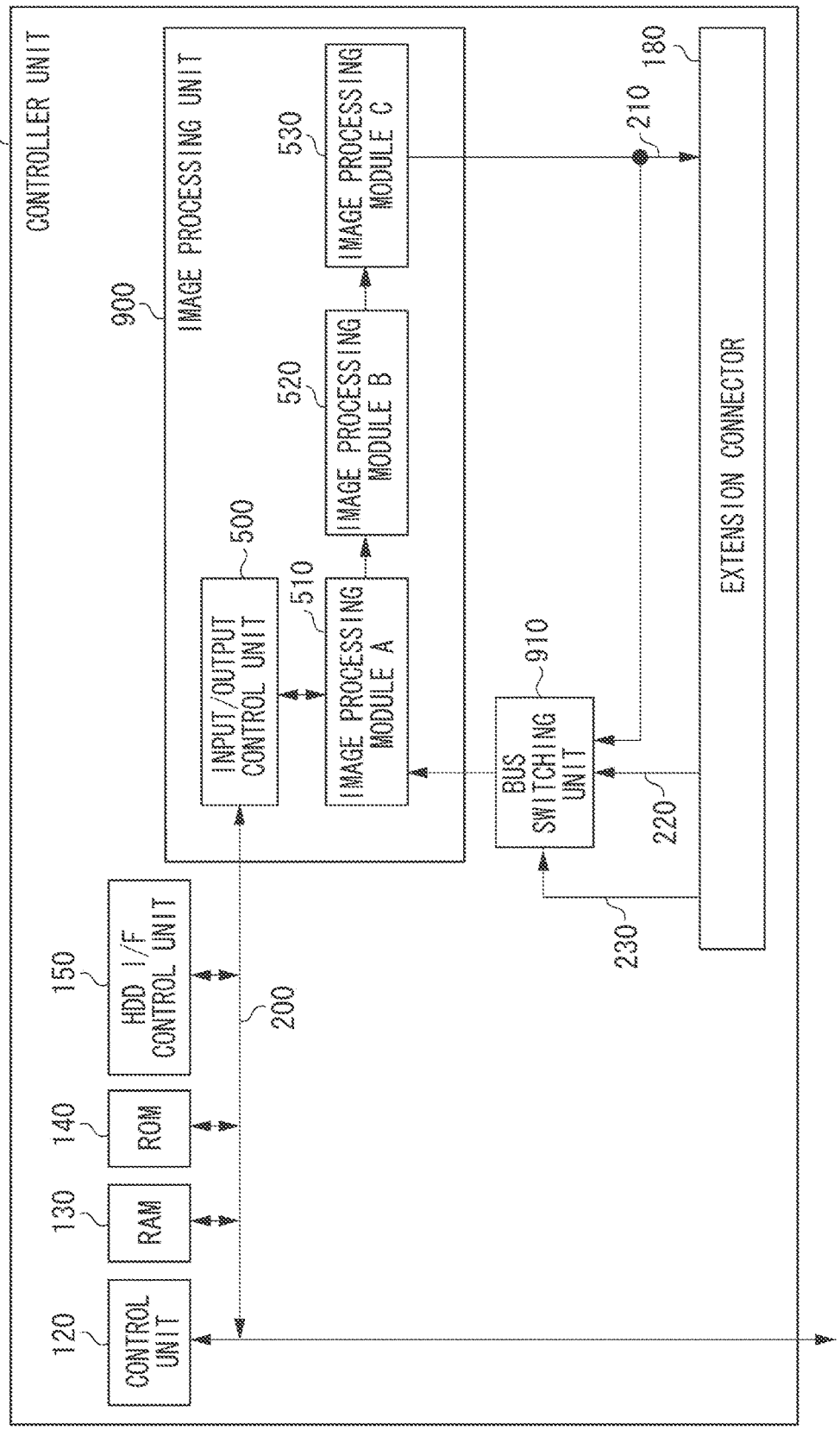
FIG. 5 is a diagram illustrating a configuration of a controller unit according to still another exemplary embodiment.

FIG. 5 is a diagram illustrating a configuration of a controller unit 118 according to the third exemplary embodiment. The controller unit 118 is different from the controller unit 110 according to the first exemplary embodiment and the controller unit 115 according to the second exemplary embodiment in that a bus switching unit 910 is provided outside an image processing unit 900.

The bus switching unit 910 switches, based on the ring bus switching signal 230, the path for inputting a ring bus signal to the image processing unit 900, between the path via the output ring bus 210 and the path via the input ring bus 220.

According to the third exemplary embodiment, even though a ring bus switching unit is not provided inside the image processing unit 900, the bus switching unit 910 is provided outside the image processing unit 900 whereby the ring bus can be formed with no extension processing unit attached to the extension connector 180. When the extension processing unit 600 is connected, the ring bus including the extension processing unit 600 can be formed with the bus switching unit 910 provided outside the image processing unit 900.

In the configurations described in the first and the second exemplary embodiments, the bus switching unit is provided in the image processing unit. In the configuration described in the third exemplary embodiment, the bus switching unit is provided outside the image processing unit. In a configuration described in a fourth exemplary embodiment, the bus switching unit is provided inside the image processing unit and is controlled by the control unit 120.

Figure 6:
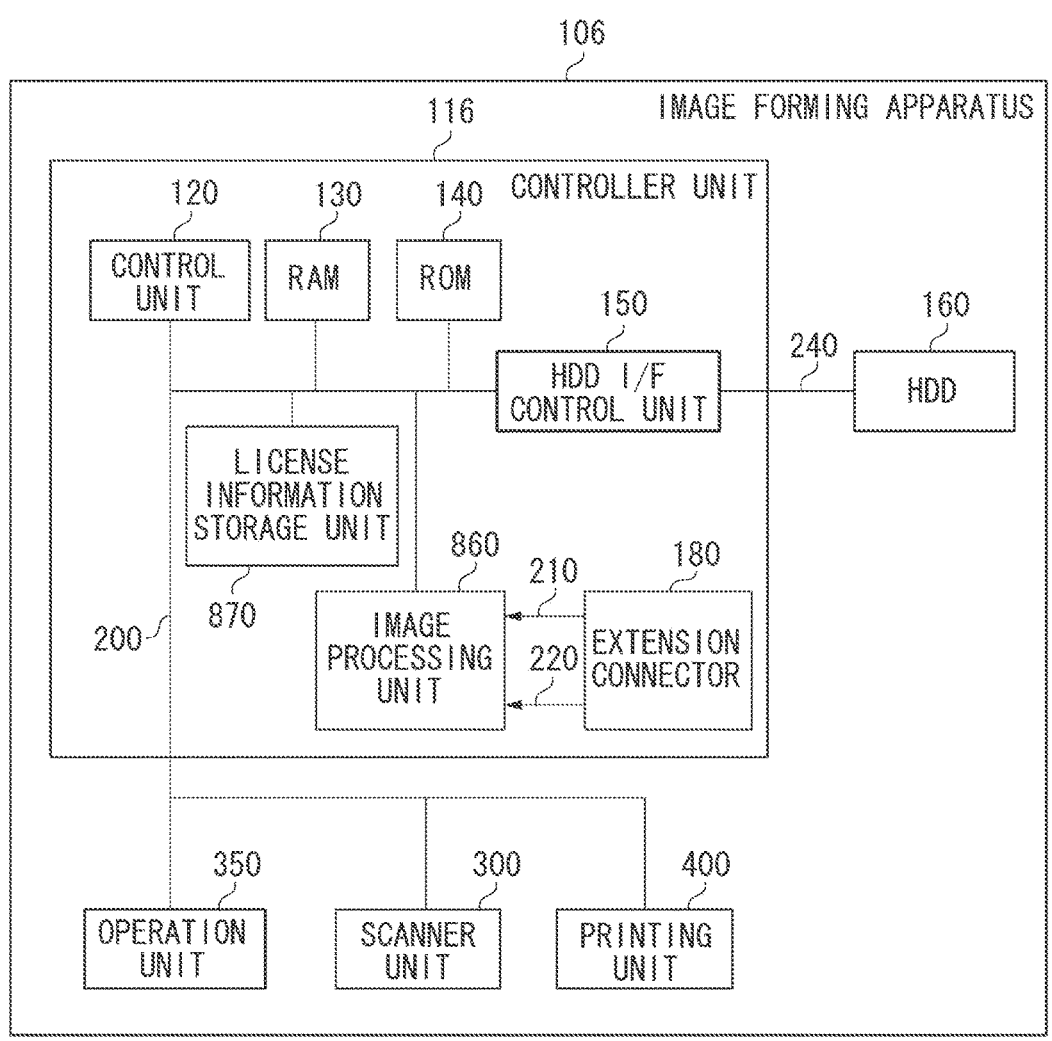
FIG. 6 is a block diagram illustrating a configuration of an image forming apparatus according to yet still another exemplary embodiment.

FIG. 6 is a block diagram illustrating a configuration of an image forming apparatus 106 according to the fourth exemplary embodiment.

The configuration of the image forming apparatus 106 is the same as the configuration of the image forming apparatus 100 except that the image forming apparatus 106 includes a controller unit 116.

The configuration of the controller unit 116 is the same as that of the controller unit 115 except that the controller unit 116 includes an image processing unit 860 and a license information storage unit 870. The image processing unit 860 is connected to the extension connector 180 via the output ring bus 210 and the input ring bus 220. Whereas input and output signals of the image processing unit 860 according to the fourth exemplary embodiment are the same as those of the image processing unit 800 according to the second exemplary embodiment, the image processing unit 860 according to the fourth exemplary embodiment has an internal block different from that in the second exemplary embodiment.

The license information storage unit 870 is a nonvolatile memory that stores therein license information. An initial value in the license information storage unit 870 is "0". When connecting the extension processing unit 600 to the extension connector 180 of the controller unit 116, the user inputs license information through the operation unit 350, so that the extension processing unit 600 can be used in the image forming apparatus 106. Upon detecting the input of the license information, the control unit 120 writes "1" to the license information storage unit 870. When the user deletes the license information, the control unit 120 writes "0" to the license information storage unit 870. Although, according to the fourth exemplary embodiment, the license information storage unit 870 is provided in the controller unit 116, the license information may be stored in the HDD 160. Alternatively, if the ROM 140 is a readable-writable memory, the license information may be stored in the ROM 140.

Figure 7:
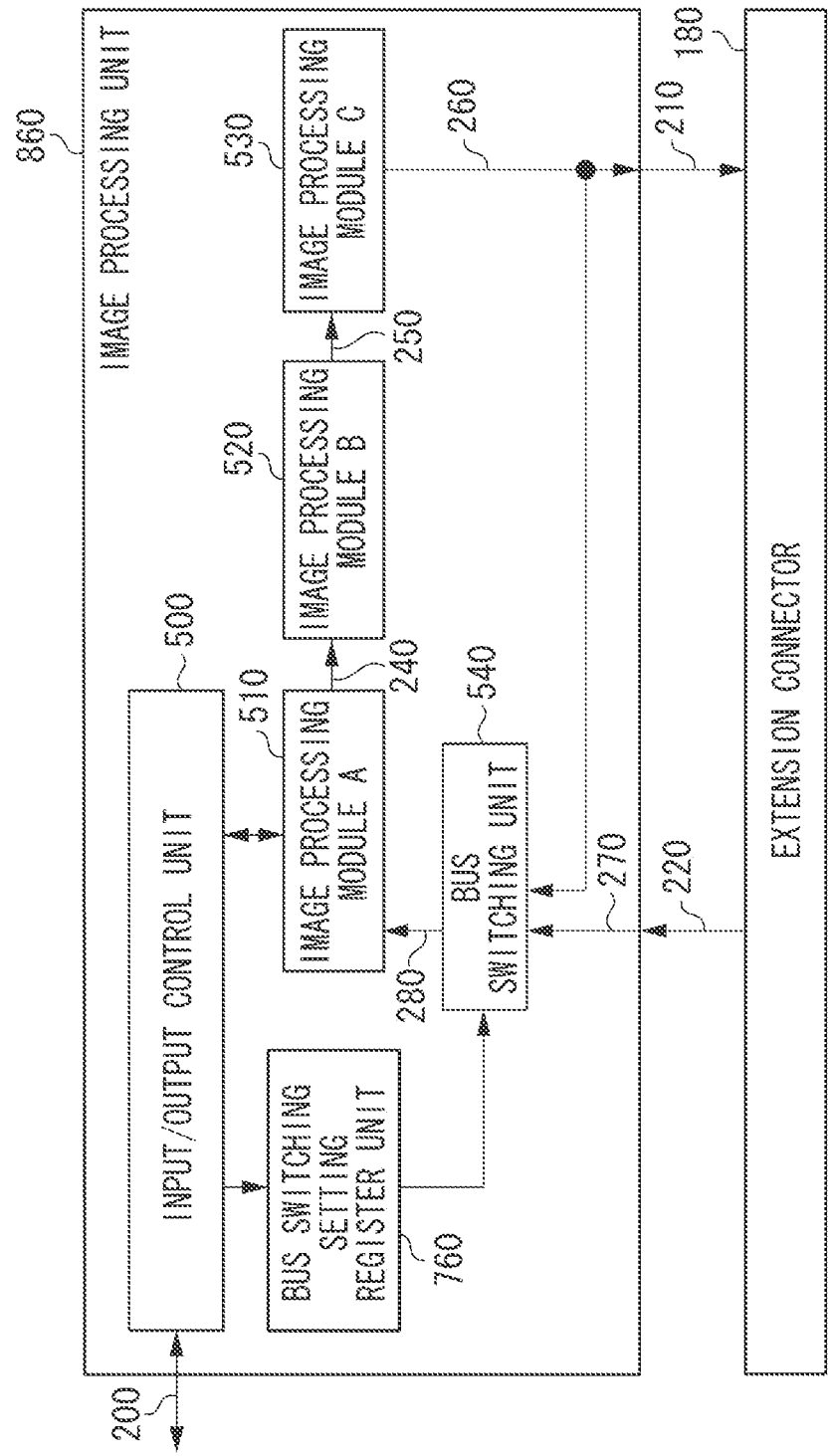
FIG. 7 is a diagram illustrating a configuration of an image processing unit according to yet still another exemplary embodiment.

FIG. 7 is a diagram illustrating a configuration of the image processing unit 860 according to the fourth exemplary embodiment.

The configuration of the image processing unit 860 is the one in which the clock detection unit 700 is replaced with a bus switching setting register unit 760 in the configuration of the image processing unit 800.

The control unit 120 sets a register value in the bus switching setting register unit 760 via the input/output control unit 500. The initial value in the bus switching setting register unit 760 is "0". In this state, the bus switching signal 290 is at the low level. In a case where the value of the bus switching setting register unit 760 is "0" and the bus switching signal 290 is thus at the low level, the bus switching unit 540 sets the bus 260 as the bus connected to the bus 280. When the control unit 120 writes "1" to the bus switching setting register unit 760 via the input/output control unit 500, the bus switching setting register unit 760 outputs the bus switching signal 290 at the high level. When the bus switching signal 290 is at the high level, the bus switching unit 540 changes the bus connected to the bus 280 from the bus 260 to the bus 270.

Figure 8:
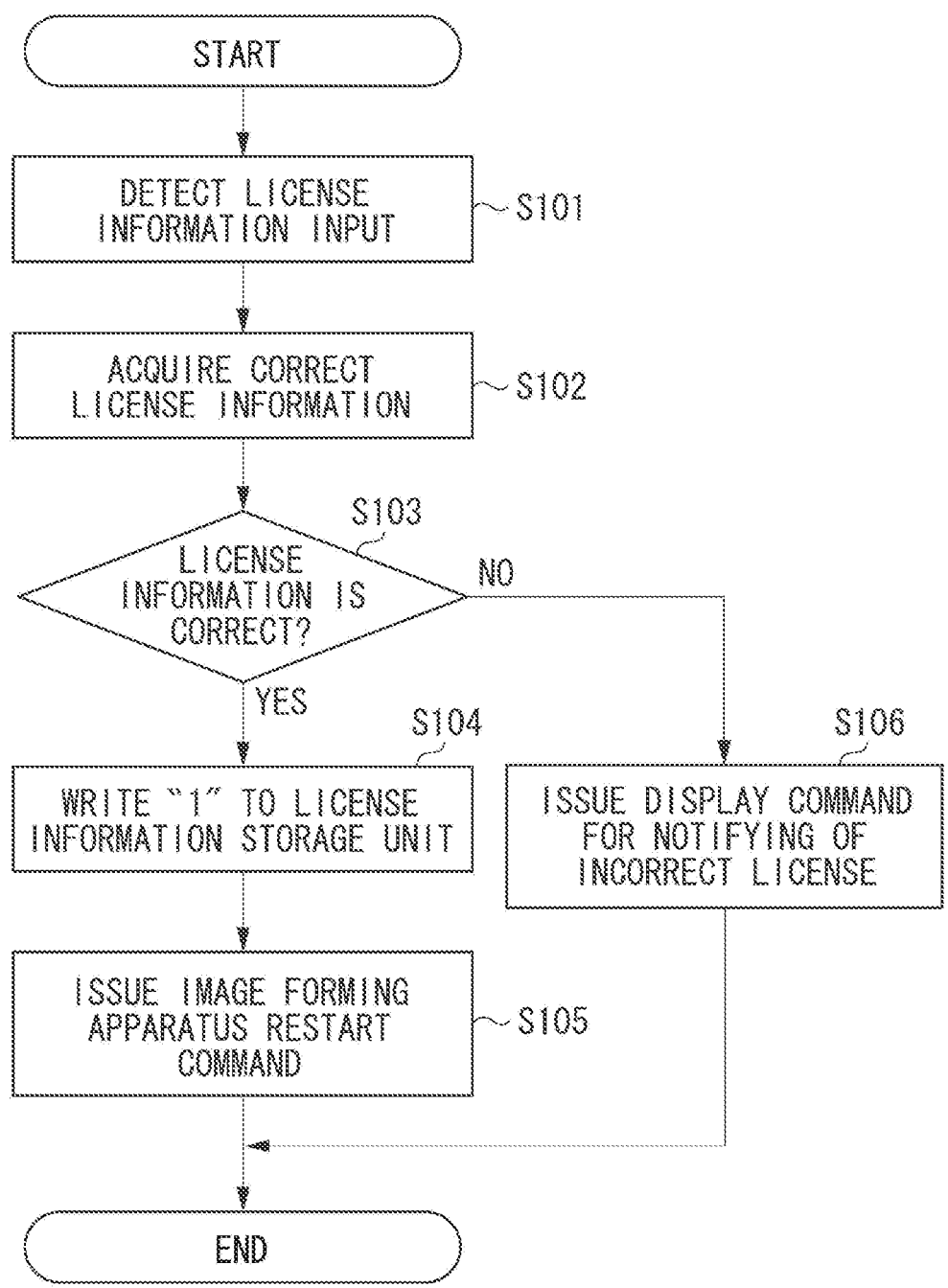
FIG. 8 is a flowchart illustrating processing executed, when license information is input, by a control unit according to yet still another exemplary embodiment.

FIG. 8 is a flowchart illustrating processing executed by the control unit 120 when the license information is input according to the fourth exemplary embodiment. In step S101, the control unit 120 executes processing of detecting the input of the license information by the user through the operation unit 350, for making the extension processing unit 600 usable in the image forming apparatus 106. When the user inputs the license information through the operation unit 350, the control unit 120 acquires the license information through the bus 200.

In step S102, the control unit 120 executes processing of acquiring correct license information that has been stored in advance in a nonvolatile memory, such as the HDD 160 or the ROM 140.

In step S103, the control unit 120 checks whether the license information that has been input is correct, by comparing the license information that has been input with the license information read from the nonvolatile memory, such as the HDD 160 or the ROM 140. In a case where the control unit 120 determines that the input license information is correct (YES in step S103), the processing proceeds to step S104. When the control unit 120 determines that the input license information is incorrect in step S103 (NO in step S103), the processing proceeds to step S106.

In step S104, the control unit 120 writes "1" to the license information storage unit 870.

In step S105, the control unit 120 issues a restart command. In response to the control unit 120 issuing the restart command, the image processing unit 860 and the HDD I/F control unit 150 in the controller unit 116, the operation unit 350, the scanner unit 300, and the printing unit 400 are reset. At the same time, the control unit 120 starts an initialization sequence so that the image forming apparatus 106 is restarted.

In step S106, the control unit 120 issues an incorrect license display command to the operation unit 350. The operation unit 350 that has received the command displays a message on a display unit (not illustrated). The message thus displayed on the display unit (not illustrated) is a message notifying the user of the fact that the input license information is incorrect, and prompting the user to input license information again.

Figure 9:
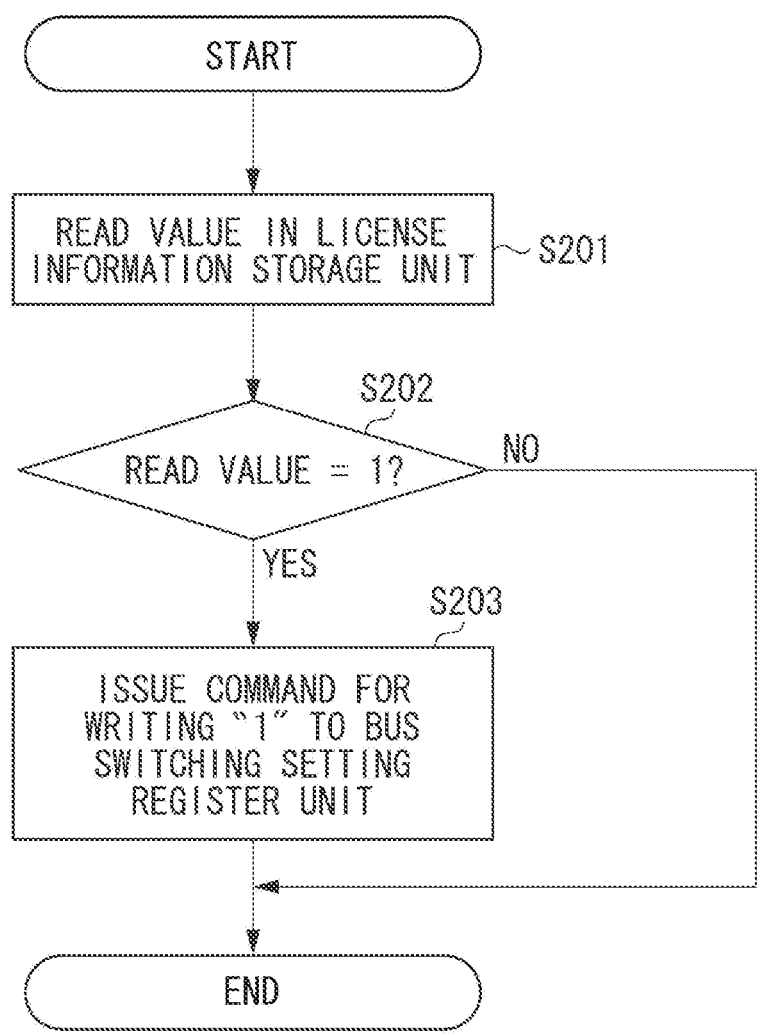
FIG. 9 is a flowchart illustrating processing, for a bus switching register unit, executed by the control unit according to yet still another exemplary embodiment.

FIG. 9 is a flowchart illustrating processing for the bus switching setting register unit 760 executed by the control unit 120 according to the fourth exemplary embodiment.

The processing illustrated in FIG. 9 is executed by the control unit 120 in accordance with a program stored in the ROM 140, at the time of when the system of the controller unit 116 is started.

In step S201, the control unit 120 reads a value in the license information storage unit 870. In step S202, the control unit 120 determines whether the value read in step S201 is "1". In a case where the control unit 120 determines that the value read from the license information storage unit 870 is "1" (YES in step S202), the processing proceeds to step S203. In a case where the control unit 120 determines that the value read from the license information storage unit 870 is not "1" (NO in step S202), the processing is terminated.

In step S203, the control unit 120 issues a command for writing "1" to the bus switching setting register unit 760 to the input/output control unit 500. The input/output control unit 500 that has received the write command writes "1" to the bus switching setting register unit 760. The bus switching signal 290 output from the bus switching setting register unit 760 is input to the bus switching unit 540, and the bus switching unit 540 switches the bus connected to the bus 280 from the bus 260 to the bus 270. In the present exemplary embodiment, the control unit 120 writes "1" to the bus switching setting register unit 760 via the input/output control unit 500. Alternatively, the bus switching setting register unit 760 may be connected to the bus 200 in the image processing unit 860, and the control unit 120 may directly write "1" to the bus switching setting register unit 760.

In the example described in the fourth exemplary embodiment, the bus switching signal 290 for causing the bus switching unit 540 to execute the switching is generated based on existence of the license information stored in the license information storage unit 870. According to the fourth exemplary embodiment, there can be provided an advantageous effect that even without an additional signal terminal in the image processing unit, the path of the ring bus can be changed.

In the fourth exemplary embodiment, there may be a case where even though the license information of the extension processing unit 600 has been store in the license information storage unit 870, the extension processing unit 600 is not connected to the extension connector 180 of the controller unit 116. In such a case, it is a matter of course that the control unit 120 issues a command for displaying a message indicating that the extension processing unit 600 is not connected to the extension connector 180 of the controller unit 116, to the operation unit 350. In addition to displaying the message, the path of the ring bus may be switched to the path of buses inside the image processing unit.

In the configurations described in the first and the second exemplary embodiments, the bus switching unit is provided in the image processing unit. In the configuration described in the third exemplary embodiment, the bus switching unit is provided outside the image processing unit. In the method described in the fourth exemplary embodiment, the control unit in the controller unit controls the bus switching unit, in the configuration where the bus switching unit is provided in the image processing unit. In a method described in a fifth exemplary embodiment, the control unit in the controller unit controls a bus switching unit by issuing, when the controller unit is started, a test packet issue command, in the configuration where the bus switching unit is provided in the image processing unit.

Figure 10:
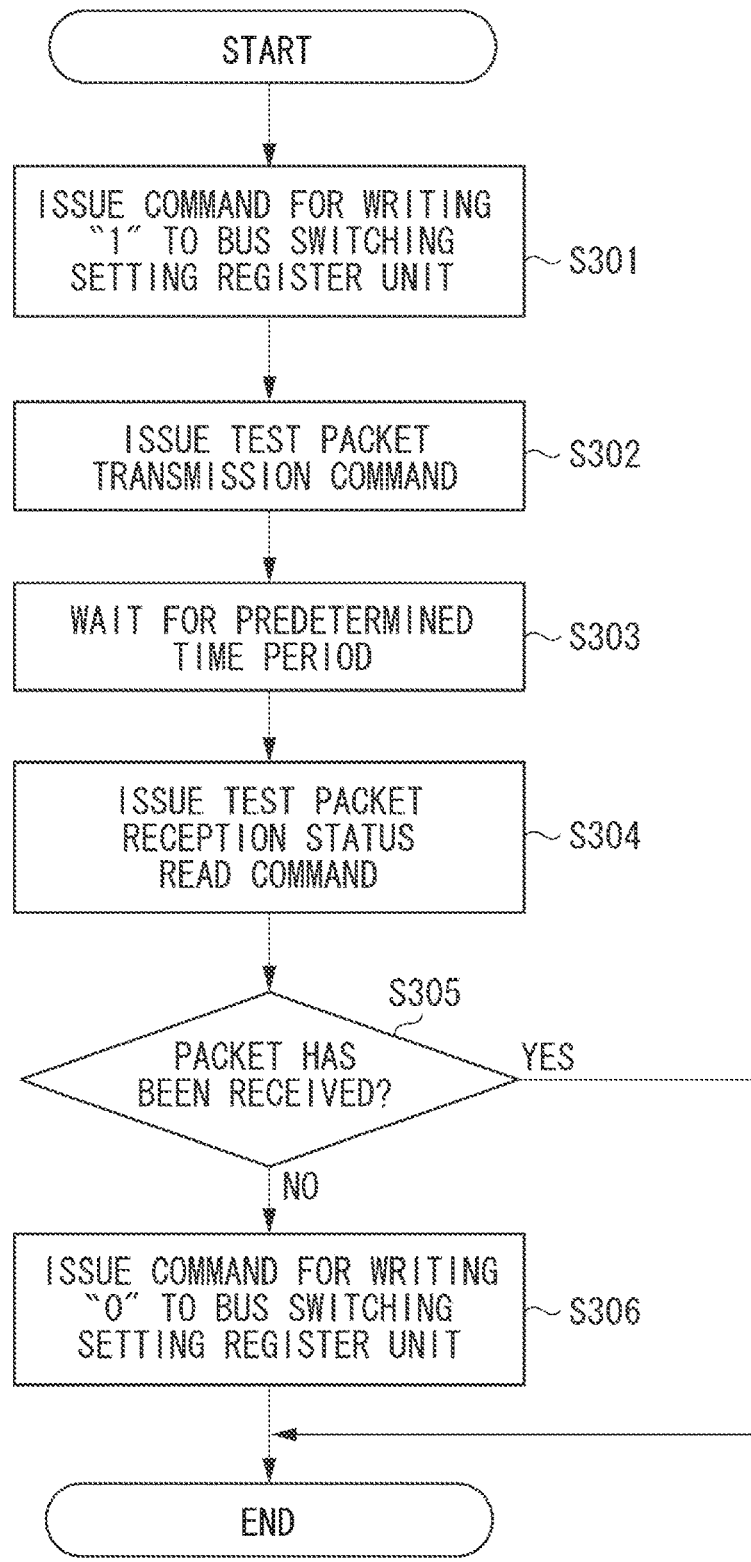
FIG. 10 is a flowchart illustrating processing, for a bus switching register unit, executed by a control unit according to further yet still another exemplary embodiment.

FIG. 10 is a flowchart illustrating processing for the bus switching setting register unit 760 executed by the control unit 120 according to the fifth exemplary embodiment. In the processing in the fifth exemplary embodiment, a test packet is output to the ring bus and the ring bus is formed. The configuration of the image forming apparatus is the one in which the image processing unit 800 illustrated in FIG. 3 is replaced with the image processing unit 860 illustrated in FIG. 7, or may be the one same as that illustrated in FIG. 6.

In step S301, the control unit 120 issues a command for writing "1" to the bus switching setting register unit 760 to the input/output control unit 500. The input/output control unit 500 that has received the write command writes "1" to the bus switching setting register unit 760. As a result, the bus switching unit 540 connects the bus 240, the bus 250, the bus 260, the output ring bus 210, the buses in the extension processing unit 600, the input ring bus 220, the bus 270, and the bus 280 in series in this order so that the ring bus is formed. In a case where the extension processing unit 600 is not connected to the extension connector 180, forming of the ring bus fails by disconnection between the output ring bus 210 and the input ring bus 220. In the exemplary embodiment, the control unit 120 writes "1" to the bus switching setting register unit 760 via the input/output control unit 500. Alternatively, the switching setting register unit 760 may be connected to the bus 200 in the image processing unit 860, and the control unit 120 may directly write "1" to the bus switching setting register unit 760. Alternatively, the initial value in the bus switching setting register unit 760 may be set to "1" in advance so that the processing in step S301 may be omitted.

In step S302, the control unit 120 issues the test packet transmission command to the input/output control unit 500. The input/output control unit 500 that has received the test packet transmission command sets the image processing module A 510, the image processing module B 520, and the image processing module C 530 to be in a test mode, and transmits the test packet to the image processing module A 510.

In step S303, the control unit 120 suspends the processing for a predetermined time period. The predetermined time may be set by the user through the operation unit 350. The input/output control unit 500 receives the test packet within this time period. The input/output control unit 500 that has received the test packet writes "1" to a test packet reception status register (not illustrated). The input/output control unit 500 that has not received the test packet writes "0" to the test packet reception status register (not illustrated).

In step S304, the control unit 120 issues a test packet reception status read command to the input/output control unit 500. The input/output control unit 500 that has received the test packet reception status read command reads a value in the test packet reception status register (not illustrated) which is included in the image processing unit 860. The input/output control unit 500 transmits the value thus read to the control unit 120 as a response.

In step S305, the control unit 120 determines whether the test packet reception status value acquired in step S304 is "1". In a case where it is determined that the test packet reception status value is "1" (YES in step S305), the processing is terminated. In a case where it is not determined that the test packet reception status value is "1" (NO in step S305), the processing proceeds to step S306.

In step S306, the control unit 120 issues a command for writing "0" to the bus switching setting register unit 760 to the input/output control unit 500. The input/output control unit 500 that has received the write command writes "0" to the bus switching setting register unit 760. As a result, the bus switching unit 540 connects the bus 240, the bus 250, the bus 260, and the bus 280 in series in this order so that the ring bus is formed. In the present exemplary embodiment, the control unit 120 writes "0" to the bus switching setting register unit 760 via the input/output control unit 500. Alternatively, the bus switching setting register unit 760 may be connected to the bus 200 in the image processing unit 860, and the control unit 120 may directly write "0" to the bus switching setting register unit 760.

In the example described in the fifth exemplary embodiment, the value in the bus switching setting register unit 760 is set by using the test packet and the bus switching signal 290 for causing the bus switching unit 540 to execute the switching is generated. According to the fifth exemplary embodiment, there can be provided an advantageous effect that even without an additional signal terminal in the image processing unit, the path of the ring bus can be changed.

According to the exemplary embodiments described above, in the configuration in which an extension processing module is connected to a ring bus via a connector, the ring bus can be formed even in a case where the module is not connected, without attachment of a unit for forming the ring bus. Further, in a case where the module is connected via the connector, the path of the ring bus can be switched to the path including the connector.

Other Embodiments

Embodiment(s) can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2015-202719, filed Oct. 14, 2015, and No. 2016-026009, filed Feb. 15, 2016, which are hereby incorporated by reference herein in their entirety.

What is claimed is:

1. An information processing apparatus comprising:
a plurality of processing modules;
a connector to which an extension processing unit is optionally attached;
a bus switching unit configured to:
receive a setting signal for setting a data path on which data passes through each of the plurality of processing modules, before receiving the data; and,
set, based on the received setting signal, a data path on which the data passes through each of the plurality of processing modules, wherein a first type of data path on which the data passes through not only the plurality of processing modules and also the extension processing unit is set as the data path when the received setting signal is a first type, and a second type of data path on which the data passes through each of the plurality of processing modules without passing through the connector is set as the data path when the received setting signal is a second type, and wherein the data is input to and output from the extension processing unit via the connector in the first type of data path.

2. The information processing apparatus according to claim 1, wherein a first signal for setting the second type of data path on which the data passes through each of the plurality of processing modules without passing through the connector is transmitted, as the setting signal, upon the attachment of the extension processing unit to the connector.

3. The information processing apparatus according to claim 2, wherein the first setting signal is transmitted to the bus switching unit from the extension processing unit.

4. The information processing apparatus according to claim 2, wherein the first signal is transmitted from the extension processing unit through a path that is different from the data path.

5. The information processing apparatus according to claim 2, further comprising a generation unit configured to generate, upon detecting a second signal from the extension processing unit, the first setting signal and transmit the first setting signal to the bus switching unit.

6. The information processing apparatus according to claim 5, wherein the second signal is transmitted to the bus switching unit.

7. The information processing apparatus according to claim 6, wherein the second signal is a clock signal.

8. The information processing apparatus according to claim 1, further comprising:
a setting signal line for transmitting the setting signal for setting the data path, wherein the setting signal line is different from the data path on which the data passes through each of the plurality of processing modules.

9. The information processing apparatus according to claim 1,
wherein the data path is a data path on which data passes through each processing module at least once.

10. The information processing apparatus according to claim 8,
wherein the setting signal line is connected to the bus switching unit.

11. The information processing apparatus according to claim 10, wherein the bus switching unit receives the setting signal via the setting signal line before receiving the data which passes through each of the plurality of processing modules.

12. The information processing apparatus according to claim 1,
wherein the bus switching unit receives the setting signal for setting the data path before the data is transmitted on the data path.

13. The information processing apparatus according to claim 1,
wherein the bus switching unit receives the data after the data path is set based on the setting signal, and transmits the received data to a next destination according to the set data path.

14. The information processing apparatus according to claim 1,
wherein in each of the first type of data path and the second type of data path, the data transmitted to a next destination by a first processing module among the plurality of processing modules is returned to the first processing module after passing through at least other processing modules among the plurality of processing modules.

15. The information processing apparatus according to claim 14,
wherein in the first type of data path, the data transmitted to the next destination by the first processing module is returned to the first processing module after passing through the other processing modules and the extension processing unit, and in the second type of data path, the data transmitted to the next destination by the first processing module is returned to the first processing module after passing through the other processing modules without passing through the connector.

16. The information processing apparatus according to claim 1,
wherein the processing modules and the extension processing unit each process image data.

17. The information processing apparatus according to claim 1,
wherein the set data path corresponds to a ring bus.

18. The information processing apparatus according to claim 1,
wherein one of the plurality of processing modules receives the data which is to be input into the set data path and receives the data which is to be output from the set data path.

19. The information processing apparatus according to claim 1, wherein the data which has passed through the plurality of processing modules according to the set data path is printed.

20. A method for setting a data path on which data passes through each of a plurality of processing modules included in an information processing apparatus, the method comprising:
receiving a setting signal for setting a data path on which data is to pass through each of the plurality of processing modules, before receiving the data;
setting the data path based on the received setting signal, wherein a first type of data path on which the data passes through not only the plurality of processing modules but also an option processing module mounted as an option when the received setting signal is a first type, and a second type of data path on which the data passes through each of the plurality of processing modules without passing through a connector to which the option processing module is optionally attached when the received setting signal is a second type; and receiving the data after the setting of the data path.

21. The method according to claim 20, wherein the received data passes through not only the plurality of processing modules but also the option processing module according the set first type of data path, and the received data passes through each of the plurality of processing modules but does not pass through the option processing module according to the set second type of data path.

22. The method according to claim 20, wherein the set data path corresponds to a ring bus.

23. The method according to claim 20, wherein one of the plurality of processing modules receives the data which is to be input into the set data path and receives the data which is to be output from the set data path.

24. The method according to claim 23, wherein the one of the plurality of processing modules transmits the received data which is to be input into the set data path to a next processing module in the set data path, and transmits the received data which is to be output from the set data path to another processing module different from processing modules in the set data path.

25. The method according to claim 20, wherein the plurality of processing modules are included in an image processing unit of the information processing apparatus.

26. The method according to claim 20, wherein the data which has passed through the plurality of processing modules according to the set data path is printed.

* * * * *